United States Patent

Murata

[11] 3,997,067
[45] Dec. 14, 1976

[54] APPARATUS FOR TRANSPORTING SUCCESSIVE PRINTED CIRCUIT BOARDS TO AND FROM A WORK STATION

[75] Inventor: Zenichi Murata, Sagamihara, Japan

[73] Assignee: Sony Corporation, Tokyo, Japan

[22] Filed: Oct. 20, 1975

[21] Appl. No.: 624,298

[30] Foreign Application Priority Data

| Oct. 24, 1974 | Japan | 49-122889 |
| Oct. 30, 1974 | Japan | 49-125281 |
| Oct. 31, 1974 | Japan | 49-125870 |
| Mar. 10, 1975 | Japan | 50-28841 |

[52] U.S. Cl. .................. 214/8.5 K; 198/476; 214/1 BC
[51] Int. Cl.² .......................... B65G 59/06
[58] Field of Search .......... 214/1 R, 1 BC, 1 BH, 214/8.5 R, 8.5 A, 8.5 C, 8.5 D, 8.5 K, 8.5 SS, 151; 198/25, 210, 52, 53 R

[56] References Cited

UNITED STATES PATENTS

| 730,920 | 6/1903 | Joecken | 214/8.5 K X |
| 3,095,982 | 7/1963 | Weiser | 214/1 BC |
| 3,363,781 | 1/1968 | Magnetti | 214/8.5 R X |
| 3,572,549 | 3/1971 | Willsey et al. | 214/8.5 C |
| 3,661,278 | 5/1972 | Hammerle | 214/8.5 K |

FOREIGN PATENTS OR APPLICATIONS

| 1,279,486 | 6/1972 | United Kingdom | 214/1 BC |

*Primary Examiner*—Frank E. Werner
*Attorney, Agent, or Firm*—Lewis H. Eslinger; Alvin Sinderbrand

[57] ABSTRACT

An apparatus for transporting successive printed circuit boards to and from a working station at which a plurality of operations are performed thereon, for example, to insert electronic elements in each board, comprises a positioning table at the working station for supporting a printed circuit board and which is turnable to change the orientation of the board for the successive operations to be performed thereon, a magazine at a loading station spaced from the working station for containing a stack of the printed circuit boards from which the latter are removed or separated one-by-one, and a conveying assembly operative to receive each board separated from the stack at the loading station and deliver such board to the positioning table at the work station and, simultaneously, to pick up a board from the positioning table after the completion of the operations thereon at the working station and discharge the completed board at an unloading station. The conveying assembly is advantageously turnable about an axis spaced equally from the loading, working and unloading stations and includes a first carrying device movable in an arcuate path between the loading and working stations in response to turning of the conveying assembly to a predetermined angular extent for the delivery to the working station of each board separated from the stack, and a second carrying device fixedly spaced from the first carrying device by the predetermined angular extent for moving in an extension of the arcuate path between the working and unloading stations so as to discharge at the unloading station the completed board picked up at the working station.

7 Claims, 11 Drawing Figures

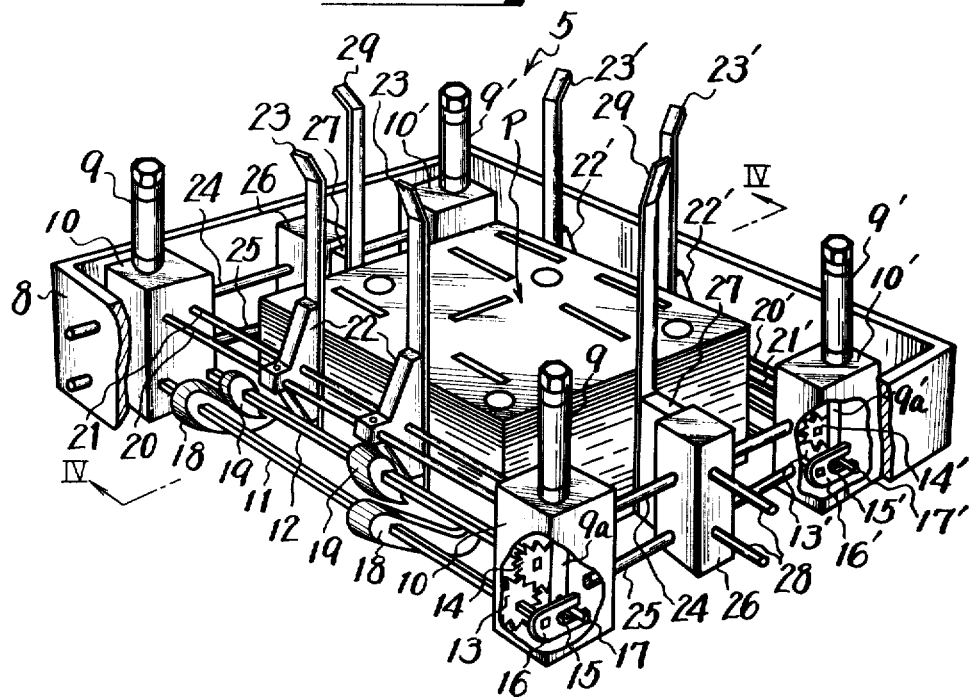
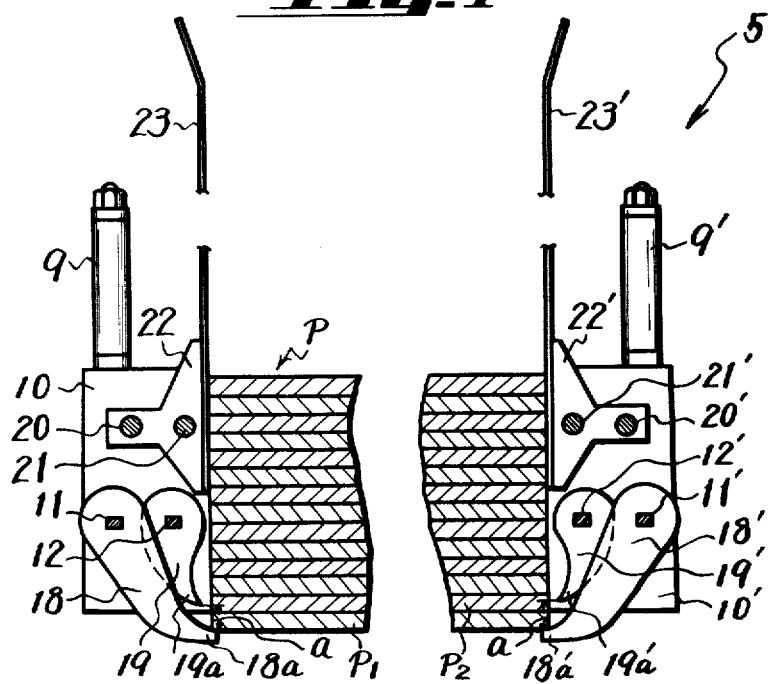

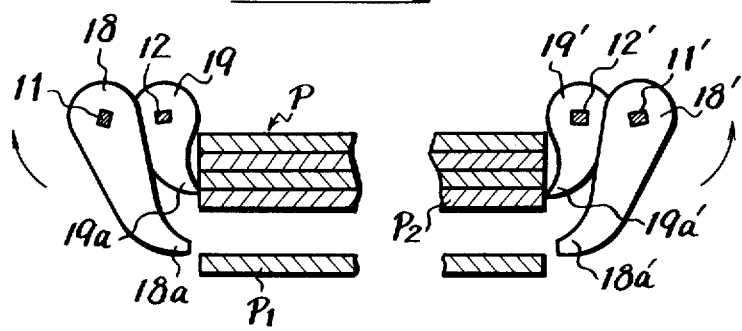
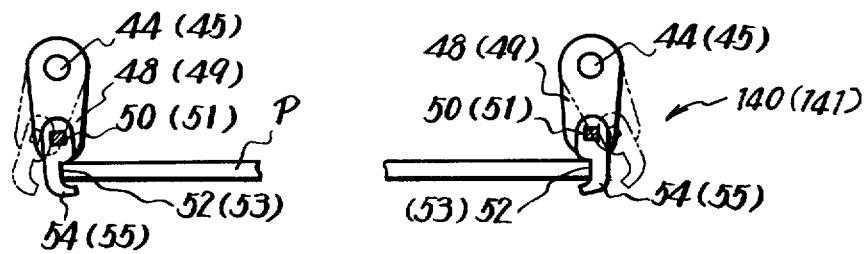
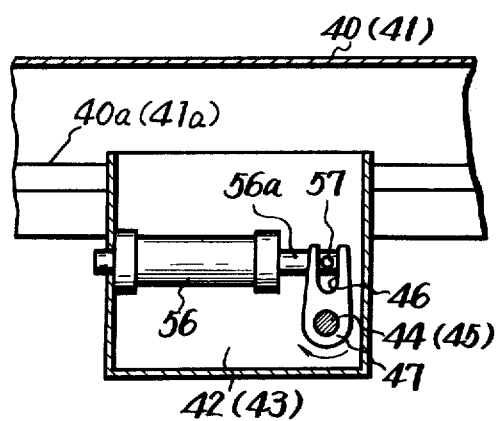

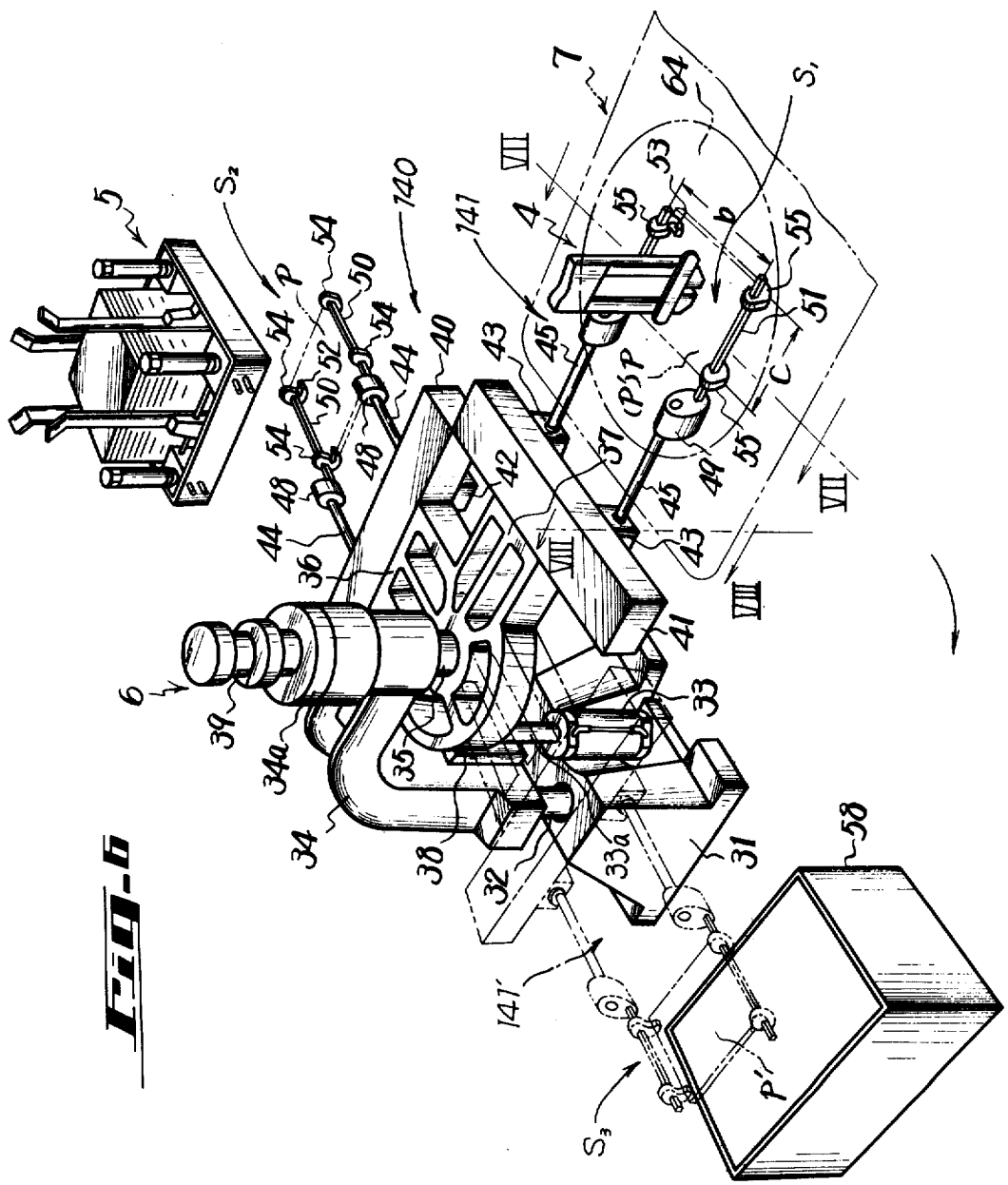

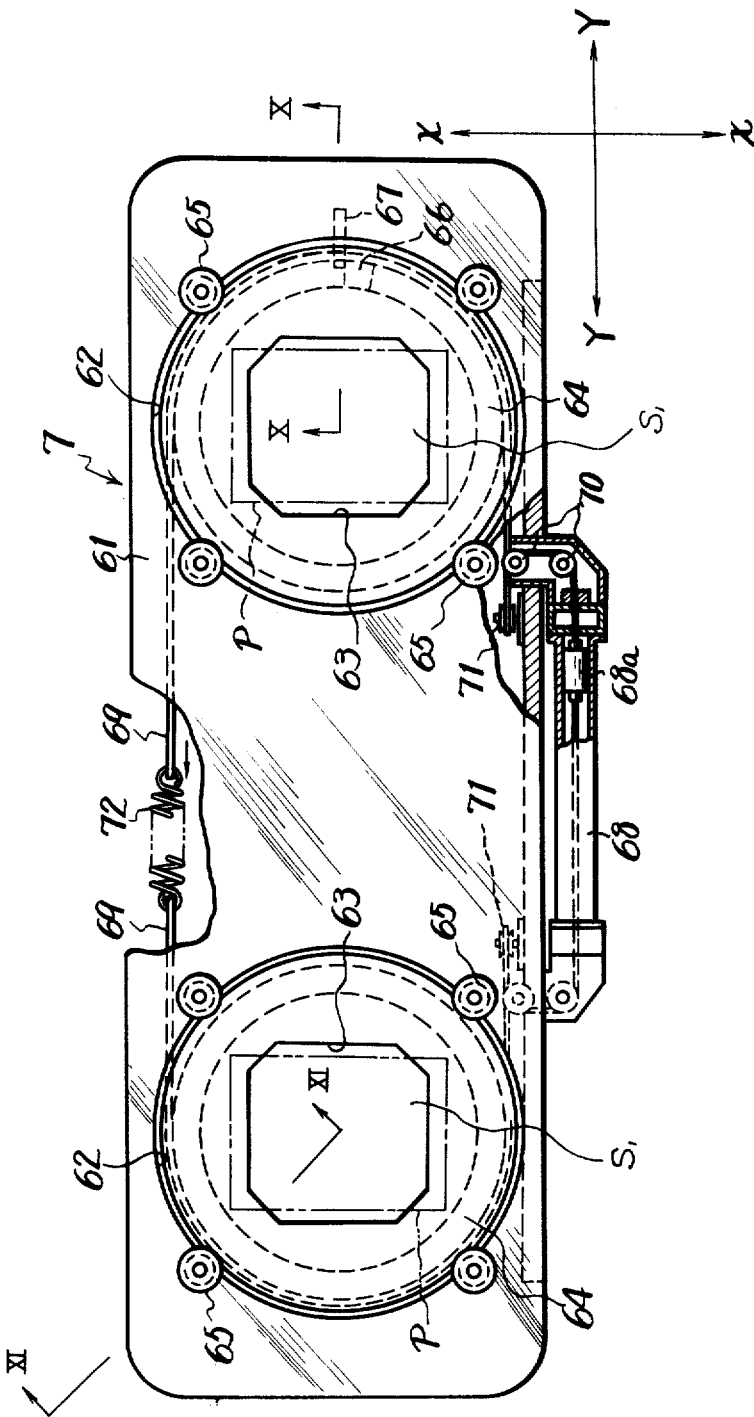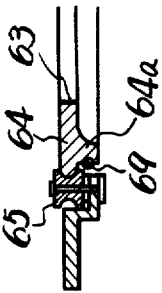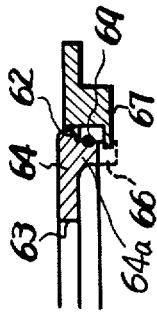

APPARATUS FOR TRANSPORTING SUCCESSIVE PRINTED CIRCUIT BOARDS TO AND FROM A WORK STATION

BACKGROUND OF THE INVENTION

1. FIELD OF THE INVENTION

This invention relates generally to apparatus for transporting successive work pieces to and from a working station at which a plurality of operations are performed thereon, and more particularly is directed to an improved apparatus, as aforesaid, in which the work pieces are printed circuit boards in which, for example, electronic parts or elements such as resistors, capacitors, IC elements and the like, are to be inserted or installed at the working station.

2. DESCRIPTION OF THE PRIOR ART

There is in existence an electronic part insertion machine which automatically supplies selected electronic parts from respective magazines or supply devices to an insertion device in accordance with a program which is predetermined by a control device, and in which the insertion device automatically inserts or installs the electronic parts delivered thereto in a printed circuit board which is located on a positioning table at a working station under the insertion device. In order to permit the fully automatic operation of such electronic part insertion machine, it is necessary to provide for the automatic transport of successive printed circuit boards to the working station from a suitable source or supply thereof, and further to provide for the automatic transport of each printed circuit board from the working station upon the completion of the insertion or installation of the electronic parts therein. Since the electronic parts are to be installed in each printed circuit board in various directions or orientations relative to the board, it is also necessary that each printed circuit board, while disposed at the working station, be rotated or turned in respect to the insertion device. Although an apparatus exists for transporting the printed circuit boards to and from the working station, as aforesaid, and such transport is effected without altering the shape, dimensions, quality and standardization of the successive printed circuit boards, the existing transporting apparatus is expensive to manufacture and maintain and is not readily adaptable to changes in the dimensions or shapes of the printed circuit boards which are to be transported or in the operations to be performed thereon at the working station. Furthermore, the possible operating speed of the autmatic electronic part insertion machine has been recently greatly increased by providing its control device in the form of a computer. However, the realization of such greatly increased operating speed of such computer controlled machine, and justification for the increased cost of the latter, have been impeded by the inability of the existing apparatus to transport the successive printed circuit boards to and from the working station at a rate commensurate with such greatly increased operating speed of the insertion machine. An existing computer-controlled electronic part insertion machine has also been provided with two heads or insertion devices for simultaneously inserting or installing selected electronic parts in printed circuit boards positioned at first and second working stations, respectively, but the existing apparatus for transporting the printed circuit boards is very expensive when applied to such machine having two heads.

OBJECTS AND SUMMARY OF THE INVENTION

Accordingly, an object of the present invention is to provide an improved apparatus for transporting successive printed circuit boards to and from a working station at which a plurality of operations are performed thereon, and which is particularly suitable for use in association with an automatic machine which is operative to insert or install a number of electronic parts, such as, resistors, capacitors and/or IC elements, in a printed circuit board while the latter is disposed at the working station.

Another object of the invention is to provide an apparatus, as aforesaid, in which a completed circuit board, for example, a board in which electronic parts or elements have been installed by the associated insertion machine while at the working station, is conveyed away from such working station to an unloading or discharging station at the same time that a printed circuit board is being conveyed to the working station from a magazine or the like containing a stack or supply of the printed circuit boards so that the successive printed circuit boards can be transported to and from the working station at a speed or rate that is commensurate with the high operating speed of the automatic electronic part insertion machine made possible by the computer control of the latter.

A further object of the invention is to provide an apparatus for transporting successive printed circuit boards to and from a working station, as aforesaid, and in which each printed circuit board, when disposed at the working station, is located on a positioning table which may be turned or rotated automatically in accordance with the directions or orientations in which the electronic parts are to be installed in each printed circuit board by the associated insertion machine.

Still another object of the invention is to provide an apparatus, as aforesaid, with an improved device by which the printed circuit boards arranged in a stack in a magazine or the like can be separated one-by-one from such stack for conveyance to the working station, and in which such separation of the successive boards from the stack thereof can be achieved at high speed without causing abrasion or other damage to the printed circuit board.

A still further object is to provide an apparatus, as aforesaid, which is relatively simple in construction and operation, and which is adapted for association with an electronic part insertion machine so as to permit the latter to be controlled in a completely automatic manner as by a computer control.

In accordance with an aspect of this invention, an apparatus for transporting successive printed circuit boards to and from a working station at which a plurality of operations are to be performed thereon, for example, to insert or install electronic parts or elements in each board, comprises positioning means at the working station for supporting a printed circuit board during the performance of such operations thereon, means for turning the positioning means so as to change the orientation of a printed circuit board supported thereon for the respective operations, a magazine for containing a stack of the printed circuit boards and being located at a loading station spaced from the working station, separating means for separating the printed circuit boards one-by-one from a stack thereof in the magazine, and conveying means turnable about an axis spaced equally from the loading and working stations and including first carrying means movable in an arcuate path between the loading and working station in response to turning of the conveying means by a predetermined angular extent, and second carrying means fixedly spaced from the first carrying means by the predetermined angular extent for moving, in response to the turning of the conveying means, in an extension of the arcuate path between the working station and an unloading station spaced from the working station in the direction away from the loading station. In the foregoing apparatus, the first carrying means is operative for receiving a printed circuit board separated by the separating means from a stack in the magazine at the loading station and delivering such board to the positioning means at the working station while the second carrying means is simultaneously operative for picking up a printed circuit board from the positioning means after the completion of the operations thereon at the working station and discharging the completed board at the unloading station.

The above, and other objects, features and advantages of the invention, will be apparent from the following detailed description of an illustrative embodiment which is to be read in conjunction with the accompanying drawings.

BRIEF DESCRIPTION OF THE DRAWINGS

FIG. 3 is an enlarged perspective view of a portion of the transporting apparatus according to this invention, and more particularly of a magazine for holding a stack of printed circuit boards and a device by which such printed circuit boards are separated one-by-one from the stack thereof;

FIG. 4 is an enlarged cross-sectional view taken along the line IV—IV on FIG. 3, but in which the frame of the magazine has been omitted;

FIG. 5 is a sectional view similar to a portion of FIG. 4, but in which the parts of the separating device are shown in other operating positions thereof;

FIG. 6 is an enlarged perspective view showing details of an apparatus according to this invention for transporting successive printed circuit boards to and from one of the working stations of the electronic part invention machine of FIGS. 1 and 2;

FIG. 7 is an enlarged schematic sectional view taken along the line VII—VII on FIG. 6, and particularly showing gripping members of one of the carrying devices included in a conveying assembly of the apparatus according to this invention;

FIG. 8 is an enlarged detail sectional view taken along the line VIII—VIII on FIG. 6, and particularly showing an actuating device for one of the gripping members appearing on FIG. 7;

FIG. 9 is an enlarged top plan view of a positioning table assembly included in the transporting apparatus according to this invention, and which is shown partly broken away and in section; and FIGS. 10 and 11 are detail sectional views taken along the lines X—X and XI—XI, respectively, on FIG. 9.

DESCRIPTION OF A PREFERRED EMBODIMENT

Figure 1:
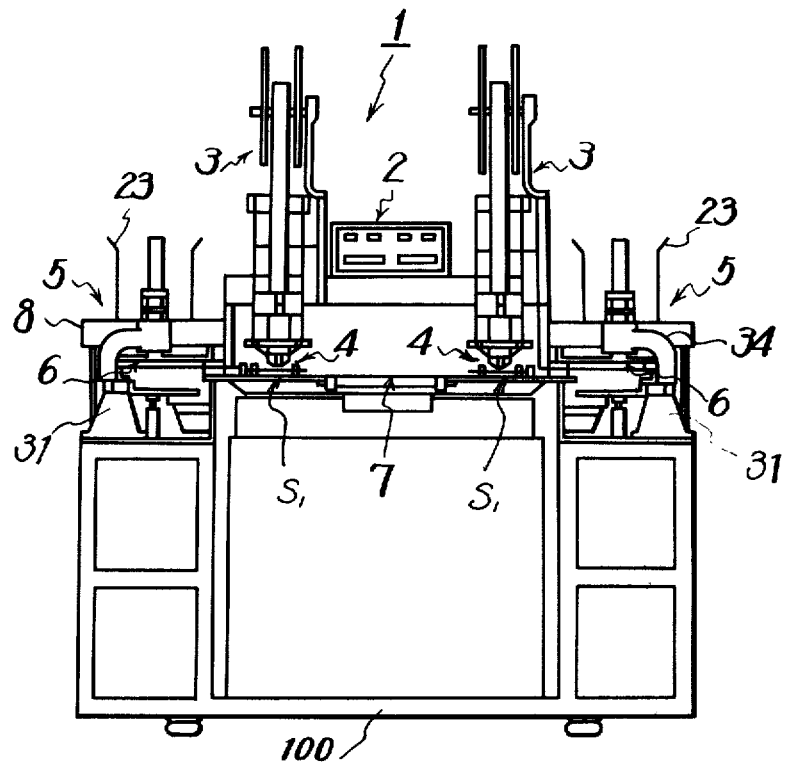
FIG. 1 is a schematic front elevational view of an electronic part insertion machine having associated therewith apparatus according to an embodiment of this invention for transporting successive printed circuit boards to and from working stations in such machine.
Figure 2:
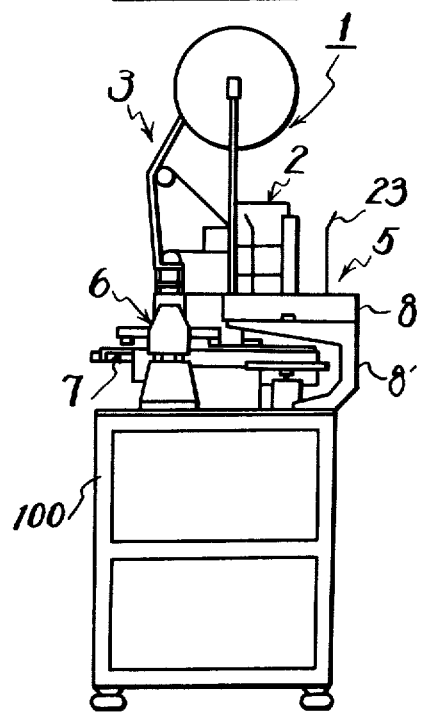
FIG. 2 is a schematic side elevational view of the electronic part insertion machine and associated transporting apparatus shown on FIG. 1.

Referring to the drawings in detail, and initially to FIGS. 1 and 2 thereof, it will be seen that an automatic electronic part insertion machine 1 with which apparatus according to this invention for transporting successive printed circuit boards to and from a working station may be advantageously associated generally comprises a control device 2, for example, in the form of a conventional computer, a pair of electronic part supply devices 3, and a pair of electronic part insertion devices or heads 4. The foregoing devices making up the electronic part insertion machine 1 are well known and their particular nature and construction are not required for an understanding of the present invention so that such devices 2, 3 and 4 will not be described in detail. However, it should be generally noted that, in accordance with a program that is predetermined or established by the control device 2, each of the supply devices 3 is made operative to deliver selected electronic parts from supplies thereof in such device 3 to the associated one of the insertion devices 4 which is, in turn, made operative to insert or install the electronic parts thus delivered thereto in a printed circuit board then positioned at a working station $S_1$ located under the respective insertion device 4.

In the case where the electronic part insertion machine 1 has two heads or insertion devices 4 arranged sidy-by-side, as shown, the apparatus according to this invention for transporting successive printed circuit boards to and from the working stations $S_1$ beneath such heads 4 generally comprises two printed circuit board supply devices 5 and two respective circuit board conveying assemblies 6 disposed at opposite sides of the machine 1 on a frame 100, and a positioning table assembly 7 which extends across the front of the machine 1 under heads 4 for supporting and positioning printed circuit boards at the respective working stations $S_1$.

Referring now to FIGS. 3–5, it will be seen that each of the printed circuit board supply devices 5 may include a rectangular frame 8 supported, as on a bracket 8' (FIG. 2), on a frame 100 so as to be disposed in back of the associated carrying assembly 6. A pair of forward housings 10 are mounted within frame 8 adajcent the opposite sides of the latter, and a similar pair of rear housings 10' are mounted within frame 8 adjacent the opposite sides of the latter. Air operated cylinders 9 and 9' are mounted on housings 10 and 10', respectively, and have piston rods 9a and 9'a which extend vertically downward within the respective housings 10 and 10' (FIG. 3). The supplying of air under pressure to cylinders 9 and 9' is suitably controlled in a conventional manner in response to electrical or other instructions from the control device 2 so as to selectively effect the upward and downward movement of piston rods 9a and 9'a. The forward and rear housings 10 and 10' adjacent each side of frame 8 are slidably mounted on upper and lower support rods 24 and 25 which extend parallel to the adjacent side of the frame and which have their opposite end portions suitably mounted in the front and back portions of frame 8. Therefore, the front and rear housings 10 and 10' adjacent each side of the frame are adjustable toward and away from each other along rods 24 and 25 for accommodating printed circuit boards of various sizes in the respective device 5, as hereinafter described in detail. Laterally extendings rods 20 and 21 are suitably secured, at their ends, to the forward housings 10, and lateral rods 20' and 21' similarly extend between the rear housings 10' so that the forward housings 10 and the rear housings 10' will be movable as units, along the support rods 24 and 25. Pairs of support brackets 22 and 22' are mounted on lateral rods 20, 21 and 20', 21', respectively, and are slidably adjustable therealong, and substantially vertical guide elements 23 and 23' are secured to brackets 22 and 22' so as to define the front and back, respectively, of a magazine for containing a substantially vertical stack of printed circuit boards P. In order to define the opposite sides of such magazine, substantially vertical guide elements 29 are secured, at their lower portions, to respective support members 27 provided with laterally outward extending rods 28 which extend slidably through respective bores in bodies 26 fixed on support rods 24 and 25 approximately at the midpoints thereof. In order that printed circuit boards P may be conveniently inserted, from above, into the magazine defined at the front and back by the guide elements 23 and 23' and at its opposite sides by the guide elements 29, the upper ends of such guide elements 23, 23' and 29 may be bent outwardly, as shown.

In order to adjust the above decribed magazine for containing a stack of printed circuit boards of a particular size, the forward and rear housings 10 and 10' are adjusted along the respective support rods 24 and 25 until the distance between the front and back guide elements 23 and 23' is approximately equal to the corresponding dimension of each printed circuit board to be accommodated therebetween, whereupon the members 27 are displaced laterally relative to the respective fixed bodies 26 until the distance between the side guide elements 29 is equal to the corresponding dimension of the printed circuit boards. Following such positional adjustment of the guide elements 23, 23', and 29, the housings 10 and 10' are secured on the respective support rods 24 and 25, for example, by the tightening of suitable set screws (not shown), and each member 27 is fixed relative to the respective body 26, for example, by the tightening of suitable set screws (not shown) which may be threaded in each body 26 for engagement with the respective rods 28.

In order to support the stack of printed circuit boards P within the magazine and to separate such printed circuit boards one-by-one from the stack at the bottom of the latter, each device 5 is further shown to include shafts 11 and 12 extending laterally between, and having their opposite ends journalled in forward housings 10, and shafts 11' and 12' similarly extending between rear housings 10'. Meshing gears 13 and 14 are secured on the ends of shafts 11 and 12 within housings 10, and meshing gears 13' 14' are similarly secured on the ends of shafts 11' and 12' within housings 10' (FIG. 3) so that shafts 12 and 12' will rotate in directions opposed to the directions of rotation of shafts 11 and 11', respectively. Lever arms 16 and 16' having longitudinal slots 15 and 15' are fixed on the ends of shafts 11 and 11', respectively, within housings 10 and 10', and such slots 15 and 15' respectively receive drive pins 17 and 17' which project from the piston rods 9a and 9'a within the respective housings. Thus, in response to actuation of the air cylinders 9 and 9' and the resulting upward or downward movements of the respective piston rods 9a and 9'a, lever arms 16 and 16' are angularly displaced to effect corresponding turning of the shafts 11 and 11' and, through the meshing gears 13, 14 and 13', 14', turning of the shafts 12 and 12' in the opposed directions.

A plurality of claw-like members 18 are secured on shaft 11 at spaced apart locations along the latter so as to extend generally downward and inwardly from shaft 11, and similar claw-like members 18' are secured at spaced apart locations on shaft 11' so as to extend generally downward and inwardly from the latter. Thus, in response to turning of shafts 11 and 11', the end portions 18a and 18'a of claw-like members 18 and 18' are movable toward and away from each other for engaging under the adjacent edge portions of the lowermost printed circuit board $P_1$ and thereby supporting the stack in the magazine, as shown on FIG. 4, and for releasing such lowermost printed circuit board $P_1$ and permitting the latter to fall from the stack, as shown on FIG. 5. Further, a plurality of claw-like members 19 and 19' are secured on shafts 12 and 12', respectively, at positions spaced apart along the latter and extend generally downward and inwardly from the respective shafts 12 and 12'. The claw-like members 19 and 19' are dimensioned so that their sharply pointed ends 19a and 19'a are spaced upwardly from the upper surfaces of end portions 18a and 18'a, respectively, of claw-like members 18 and 18' in the engaged positions of the latter by a distance a (FIG. 4) which is approximately equal to 1½ times the thickness of each of the printed circuit boards P. Further, the claw-like members 19 and 19' are angularly disposed on the respective shafts 12 and 12' so that, when claw-like members 18 and 18' are in their engaged positions to support the lowermost board $P_1$ in the stack, the sharply pointed ends 19a and 19'a of claw-like members 19 and 19' are relatively widely spaced apart so as to be disengaged from the board $p_2$ in the stack which is next above the lowermost board $P_1$ (FIG. 4). However, when air under pressure is supplied to cylinders 9 and 9' in the direction to cause downward movement of the respective piston rods 9a and 9'a, shafts 11 and 11' and the claw-like members 18 and 18' thereon are turned in the direction of the arrows on FIG. 5 so as to move the end portions 18a and 18'a away from each other and thereby release the lowermost board $P_1$ and permit the latter to fall from the stack. By reason of the meshing gears 13, 14 and 13', 14', the turning of shafts 11 and 11' in the directions for moving the respective claw-like members 18 and 18' to their disengaged or releasing positions is accompanied by turning of shafts 12 and 12' in the opposite directions so that claw-like members 19 and 19' are turned with shafts 12 and 12' for pressing their sharply pointed ends 19a and 19'a against the adjacent edges of the next board $P_2$, whereby to temporarily support the stack of printed circuit boards within the magazine.

Following the release of the lowermost board $P_1$ from the stack, as described above, air under pressure is supplied to cylinders 9 and 9' in the direction to effect upward movement of the piston rods 9a and 9'a, with the result that the claw-like members 18, 18' and 19, 19' are returned to the positions shown on FIG. 4, in which case the stack of printed circuit boards in the magazine is once again supported by the end portions 18a and 18'a of claw-like members and 18 and 18' engaging under the adjacent edge portions of the board which is then lowermost in the stack, while the claw-like members 19 and 19' are again in their released positions.

Referring now to FIG. 6, it will be seen that each of the conveying assemblies 6 may advantageously comprise a base 31 mounted on the machine frame 100 (FIG. 1) and formed with vertical bores which slidably receive plungers or guide rods 32 depending from a support arm 34 of inverted L-shaped configuration so that support arm 34 may be moved vertically relative to base 31. An air cylinder 33 is mounted on base 31 and has its piston rod 33a extending vertically upward from cylinder 33 and secured to support arm 34 so that the supplying of air under pressure to either the lower end or the upper end of cylinder 33 is effective to cause upward or downward movement, respectively, of arm 34. The horizontally extending portion of support arm 34 carries a bearing 34a in which a depending vertical shaft 35 is journalled. A support member 38 is secured on the lower end portion of shaft 35 and is formed with substantially right-angularly related portions 36 and 37 which are directed substantially radially in respect to the axis of shaft 35. A conventional rotary air cylinder 39 is mounted on support arm 34 and suitably connected with shaft 35 for effecting oscillatory or turning movements of shaft 35 and of the support member 38 thereon through approximately 90° between the starting position shown in full lines on FIG. 6 and a final position indicated in broken lines on that view of the drawings. Channel-like guide frames 40 and 41 which extend at right angles to each other are suitably secured to the free ends of the radially directed portions 36 and 37, respectively, of support member 38. As shown on FIG. 8 with respect to the guide frame 40, the guide frames 40 and 41 have interior guide members 40a and 41a, respectively, extending therealong for slidably supporting a pair of housings 42 and a pair of housings 43, respectively. Thus, the lateral distance between housings 42 and between housings 43 can be suitably adjusted.

The conveying assembly 6 is further shown to comprise a first board carrying device 140 which is supported by, and extends outwardly from guide frame 40, and a similar second board carrying device 141 which is supported by and extends outwardly from the guide frame 141. The carrying devices 140 and 141 are shown to include pairs of parallel support shafts 44 and 45, respectively, which at their inner ends are journalled in the respective housings 42 and 43. Downwardly directed eccentric connectors 48 and 49 are secured on the outer ends of shafts 44 and 45, respectively, and support rods 50 and 51 extend outwardly from connectors 48 and 49 so as to be offset downwardly from the respective shafts 44 and 45. As shown particularly on FIG. 8, upwardly directed lever arms 47 are secured on the inner end portions of shafts 44 and 45 within the respective housings 42 and 43 and are formed with longitudinal slots 46. Further, each of the housings 42 and 43 has a horizontally directed air cylinder 56 fixedly mounted therein, and the piston rod 56a of each air cylinder 56 is provided with a pin 57 projecting therefrom to engage slidably in the slot 46 of the respective lever arm 47. Thus, the supplying of air under pressure to one end of each air cylinder 56 for extending its piston rod 56a will be effective to turn the respective shaft 44 or 45 in the direction of the arrow on FIG. 8, while the supplying of air under pressure to the other end of the cylinder 56 for retracting its piston rod 56a will be effective to turn the respective shaft 44 or 45 in the opposite direction. By reason of the downwardly offset relationship of rods 50 and 51 to the respective shafts 44 and 45, the described turning of such shafts 44 and 45 will be effective to move the rods 50 or 51 toward or away from each other. At least two gripping members 54 having inwardly directed recesses 52 are mounted on each of rods 50 at locations spaced along the latter and, similarly, at least two gripping members 55 havijng inwardly directed recesses 53 are mounted on each of the rods 51 at locations spaced apart along the latter.

In setting up the conveying assembly 6 for the carrying of the successive printed circuit boards separated one-by-one from the stack in the magazine or supply device 5 at a loading station $S_2$ and delivering such successive boards to the respective working station $S_1$, the housings 42 and 43 are adjustably positioned relative to the respective guide frames 40 and 41 so that, when air cylinders 56 cause the movement of rods 50 and 51 toward each other, as shown in full lines on FIG. 7, the distance $b$ therebetween on FIG. 6 will equal the corresponding dimension of a printed circuit board P and gripping members 54 and 55 will be effective to grip the adjacent side edges of a printed circuit board P in their respective recesses 52 and 53. Conversely, when air cylinders 56 are operated to cause movement of rods 50 and 51 away from each other, the corresponding movements of gripping members 54 and 55, for example, to the positions shown in broken lines on FIG. 7, will cause the release of a printed circuit board therebetween. Further, the gripping members 54 and 55 are adjustably positioned along their respective support rods 50 and 51 so that the distance $c$ therebetween (FIG. 6) will be adapted for the carrying of printed circuit boards having a slightly larger dimension in the direction parallel to such rods 50 and 51.

As is apparent on FIG. 6, the conveying assembly 6 is disposed so that its carrying devices 140 and 141 will be movable, in response to turning of shaft 35 in bearing 34a in a horizontal plane which extends below the printed circuit board supply device 5 at the respective loading station $S_2$ and above the positioning table assembly 7 at the respective working station $S_1$. Further, the conveying assembly 6 is located so that its turning axis, that is, the axis of vertical shaft 35, will be substantially equally spaced from the respective working and loading stations $S_1$ and $S_2$. When conveying assembly 6 is in its starting position, as shown in full lines on FIG. 6, carrying device 140 is disposed at the respective loading station $S_2$ for receiving the printed circuit board separated downwardly from the supply device 5 at such station, while carrying device 141 is disposed at the respective working station $S_1$ for picking up a completed circuit board, that is, one in which electronic parts have been installed by the respective head or insertion device 4.

Thereafter, turning of support member 38 through 90° by suitable operation of the rotary air cylinder 39 is effective to move carrying device 140 in an arcuate path from loading station $S_2$ to working station $S_1$ for delivering the received printed circuit board to such working station, while the carrying device 141 is simultaneously moved in an extension of such arcuate path from the working station $S_1$ to the position indicated in broken lines at 141' on FIG. 6, that is, to an unloading station $S_3$ at which the completed printed circuit board picked up by the carrying device 141 is discharged, for example, into a holder or receptacle 58 for the completed printed circuit boards.

Referring now to FIG. 9, it will be seen that the positioning table assembly 7 for association with the insertion machine 1 of FIGS. 1 and 2 comprises a rectangular support plate 61 which is suitably mounted, for example, on sets of orthoganally related slides or guides (not shown), so as to be movable relative to the heads or insertion devices 4 in the lateral and longitudinal directions indicated by the arrows X and Y on FIG. 9. Such displacements or movements of the plate 61 may be effected by suitable air cylinders (not shown) which have air under pressure selectively supplied thereto under the control of instructions from the computer or other control device 2. The plate 61 is shown to be formed with circular openings 62 which are concentric with the working stations $S_1$ of the respective heads or insertion devices 4. A rotary disc or positioning table 64 is disposed within each circular opening 61 and is, in turn, formed with a polygonal opening 63. Each of the positioning tables 64 is rotatably supported within the respective circular opening 62 by means of grooved rollers 65 which are rotatably mounted on plate 61 and engage the outer circular edge of the rotary positioning table 64. A projection 66 depends from one of the rotary positioning tables 64 adjacent the edge of the latter (FIGS. 9 and 10) and is engageable with an abutment 67 which projects from the underside of plate 61 inwardly beyond the edge of the respective circular opening 62 for limiting the rotational movement of such positioning table 64. An air cylinder 68 is mounted at the front of support plate 61 and has its piston 68a connected to ends of oppositely directed wires or cables 69. The wires or cables 69 extend slidably through suitable packings at the opposite ends of cylinder 68 and are guided around guide pulleys 70 and 71 mounted for rotation on vertical and horizontal axes, respectively, whereupon such wires are wrapped about grooved flanges 64a (FIGS. 10 and 11) which depend from the peripheral portions of rotary positioning tables 64. Finally, the ends of wires or cables 69 remote from cylinder 68 are connected to each other by means of a tension spring 72 so that cables 69 will always securely engage flanges 64a. It will be apparent that, when air under pressure is supplied to the left-hand end of cylinder 68, as viewed on FIG. 9, cylinder 68a will be displaced toward the right and, through cables 69, will cause simultaneous turning of positioning tables 64 in the counterclockwise direction, for example, to the position shown on the drawing in which projection 66 engages abutment 67. On the other hand, when air under pressure is supplied to the right-hand end of cylinder 68 for displacing piston 68a toward the left, positioning tables 64 will be simultaneously turned in the clockwise direction.

Although the apparatus according to this invention for transporting successive printed circuit boards to and from a working station has been shown associated with an electronic part insertion machine 1 having two insertion devices or heads 4, in which case, positioning table assembly 7 has two rotary positioning tables 64 at the working stations $S_1$ of such heads 4, the apparatus according to this invention may be associated with an insertion machine having only one or more than two insertion devices or heads 4 and, in that case, the number of rotary positining tables of assembly 7 is varied accordingly.

The above described apparatus according to this invention for transporting successive printed circuit boards to and from each of the working stations $S_1$ operates as follows:

At the commencement of an operating cycle, the printed circuit board supply device 5 is in the condition shown on FIG. 4, while the support member 38 of conveying assembly 6 is in the angular position shown in full lines on FIG. 6. Upon the generation of a suitable signal by control device 2 of the insertion machine 1 indicating that the operations to be performed on a printed circuit board at the working station $S_1$ have been completed, air cylinder 33 is driven to lower support member 38 and thereby dispose gripping members 55 of carrying device 141 on the respective positioning table 64, air cylinders 9 and 9' are driven to move the claw-like members 18, 18' and 19, 19' to the positions shown on FIG. 5 whereby to drop the lowermost printed circuit board $P_1$ from the bottom of the stack in the magazine or supply device 5, and air cylinders 56 of the carrying devices 140 and 141 are simultaneously driven to move their gripping members 54 and 55 from the positions shown in broken lines to the positions shown in full lines on FIG. 7. Thus, the gripping members 54 of carrying device 140 are made to engage the respective edges of the lowermost printed circuit board dropped or separated downwardly from the remainder of the stack in device 5, while the gripping members 55 of carrying device 141 are made to engage the respective edges of a completed printed circuit board P', that is, one in which electronic parts have been installed by the respective head 4 at the working station $S_1$. Immediately after such engagement of the gripping members 54 and 55 with the respective printed circuit boards, a suitable signal from control device 2 causes air cylinder 33 to be driven in the direction for raising support arm 34, and thence also raising carrying devices 140 and 141. Then, control device 2 causes driving of rotary air cylinder 39 to turn support member 38 through 90° from the position shown in full lines on FIG. 6, with the result that carrying device 140 transports the respective printed circuit board in an arcuate path from loading station $S_2$ to the working station $S_1$, while carrying device 141 simultaneously transports the completed printed circuit board P' from working station $S_1$ to the unloading station $S_3$. Upon the arrival of carrying devices 140 and 141 at the working station $S_1$ and the unloading station $S_3$, respectively, a suitable signal from the control device 2 causes driving of air cylinders 56 to effect the return of the gripping members 54 and 55 to their disengaged positions shown in broken lines on FIG. 7 with the result that the printed circuit board carried by device 140 is released therefrom to rest on the respective positioning table 64, while the completed printed circuit board carried by device 141 is released at unloading station $S_3$ so as to fall into the receptacle or holder 58. Thereupon, control device 2 causes driving of rotary air cylinder 39 in the direction to return support member 38 of conveying assembly 6 to the position shown in full lines on FIG. 6, and the control device 2 then causes the operation of the electronic part supply device 3 and head 4 in accordance with the predetermined program by which selected electronic parts are sequentially supplied from device 3 to head 4 and inserted or installed by the latter in the printed circuit board located on rotary positioning table 64 at working station $S_1$. During such operation of electronic part supply device 3 and head 4, the control device 2 further governs the driving of air cylinder 68 for effecting rotary movements of each positioning table 64 and also the sliding movements of the plate 61 in the directions of the arrows X and Y on FIG. 9, whereby to achieve the insertion or installation of the successive electronic parts at selected positions on the printed circuit board at working station $S_1$ and in selected orientations or directions in respect to such printed circuit board. Upon the completion of such installation of the successive electronic parts in the printed circuit board at working station $S_1$, control device 2 causes driving of air cylinder 33 in the direction for lowering support member 38 of conveying device 6 so that carrying device 141 is then again positioned for engagement with the completed printed circuit board when the above described cycle of operations is repeated.

Although the cycle of operations has been described above in respect to one of the conveying assemblies 6 and the associated printed circuit board supplying device 5 and rotary positioning table 64 of assembly 7, it will be understood that, in the case where the electronic part insertion machine 10 has two heads 4, as shown, the conveying assemblies 6, printed circuit board supplying devices 5 and rotary positioning tables 64 provided in association with the two insertion devices or heads 4 are simultaneously operated under the control of the common control device 2.

It will be appreciated that the simultaneous operation of the apparatus for transporting printed circuit boards to and from the working stations $S_1$ associated with the two heads 4 is made possible by the fact that, in accordance with this invention, the conveying assemblies 6 of such apparatus undergo rotary movements about the axes of the respective shafts 35 which are spaced laterally from the respective working stations $S_1$ in the directions away from each other and transport the successive printed circuit boards to and from the respective working stations along arcuate paths which are convex towards each other. Further, the fact that each conveying assembly 6 is operative to carry a printed circuit board P from the supply device 5 to the respective working station $S_1$ at the same time as such conveying assembly is effective to carry a completed printed circuit board P' from the working station $S_1$ to the respective unloading station $S_3$ makes it possible for the apparatus according to this invention to load and unload the printed circuit boards at a rate which is commensurate with the high speed of operation of the machine 1 made possible by the use of a computer for its control device 2. Finally, it will be seen that the apparatus according to this invention can perform all of its functions in a completely automatic fashion, without the services of any human operator.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in dthe appended claims.

What is claimed is:

1. An apparatus for transporting successive printed citcuit boards to and from a working station at which a plurality of operations are performed thereon, comprising: positioning means at said working station for supporting a printed circuit board during the performance of said operations thereon; means for turning said positioning means so as to change the orientation of a printed circuit board supported thereon for said operations, respectively; a magazine for containing a stack of the printed circuit boards and being located at a loading station spaced from said working station; separating means for separating the printed circuit boards one-by-one from a stack thereof in said magazine; and conveying means turnable about an axis spaced equally from said loading and working stations and including first carrying means movable in an arcuate path between said loading and working stations in response to turning of said conveying means by a predetermined angular extent, and second carrying means fixedly spaced from said first carrying means by said predetermined angular extent for moving, in response to said turning of the conveying means, in an extension of said arcuate path between said working station and an unloading station spaced from said working station in the direction away from said loading station, said first carrying means being operative for receiving a printed circuit board separated by said separating means from a stack in said magazine at said loading station and delivering such board to said positioning means at said working station while said second carrying means is simultaneously operative for picking up a printed circuit board from said positioning means after the completion of said operations thereon and discharging the completed board at said unloading station.

2. An apparatus according to claim 1; in which said magazine substantially vertically positions the stack of printed circuit boards contained therein, said separating means separates the printed circuit boards one-by-one from the bottom of said vertically positioned stack, said axis is substantially vertical, and said conveying means is displaceable parallel to said axis in downward and upward directions for said delivering of a board to said positioning means by said first carrying means and for said picking up of a board from said positioning means by said second carrying means, respectively.

3. An apparatus according to claim 1; in which said magazine substantially vertically positions the stack of printed circuit boards contained therein; and said separating means includes first opposed claw means movable toward and away from each other for engaging and releasing, respectively, the lowermost board in said stack, second opposed claw means located at a higher level than said first claw means and being movable toward and away from each other for engaging and releasing, respectively, the board in said stack next above said lowermost board, and actuating means for effecting movement of said first and second claw means in opposed directions so that, when said first claw means are moved away from each other to release said lowermost board, said second claw means are moved toward each other to engage and support said board next above the lowermost board.

4. An apparatus according to claim 1; in which said magazine substantially vertically positions said stack of printed circuit boards contained therein, and said separating means separates the printed circuit boards from the bottom of said vertically disposed stack; and in which each of said first and second carrying means includes opposed gripping means movable toward and away from each other for gripping and releasing, respectively, a printed circuit board therebetween, and actuating means for selectively moving said gripping means toward and away from each other.

5. An apparatus according to claim 4; further comprising means for selectively displacing said conveying means upwardly and downwardly relative to said positioning means for said picking up of a board from said positioning means by said gripping means of said second carrying means and for said delivering of a board to said positioning means by said gripping means of said first carrying means, respectively.

6. An apparatus according to claim 1; further comprising second positioning means disposed at a second working station adjacent the first mentioned working station for supporting a second printed circuit board during the performance of operations thereon, said second positioning means being also turned by said means for turning the positioning means so as to change the orientation of a printed circuit board supported on said second positioning means for said operations performed thereon; a second magazine for containing a stack of printed circuit boards and being located at a second loading station spaced from said second working station; second separating means for separating the printed circuit boards one-by-one from the stack thereof in said second magazine; and second conveying means turnable simultaneously with the first mentioned conveying means about a respective axis spaced equally from said second working station and second loading station, said second conveying means including respective first carrying means movable in a second arcuate path between said second loading station and second working station in response to turning of said second conveying means by said predetermined angular extent, and respective second carrying means fixedly spaced from said respective first carrying means by said predetermined angular extent for moving, in response to said turning of said second conveying means, in an extension of said second arcuate path between said second working station and a second unloading station spaced from said second working station in the direction away from said second loading station, said respective first carrying means being operative for receiving a printed circuit board separated by said second separating means from a stack in said second magazine at said second loading station and delivering such board to said second positioning means at said second working station while said respective second carrying means is simultaneously operative for picking up a printed circuit board from said second positioning means after the completion of said operations thereon and discharging the completed board at said second unloading station.

7. An apparatus according to claim 6; in which said first and second positioning means are disposed side-by-side, the axes about which said first and second conveying means are respectively turnable are spaced laterally from said first and second working stations, respectively, in the directions away from each other, the first mentioned and second loading stations are spaced rearwardly from the turning axes of said first and second conveying means, respectively, the first mentioned and second unloading stations are spaced forwardly from said turning axes of said first and second conveying means, respectively, and said first and second conveying means are turned simultaneously in opposite directions about said respective axes.

* * * * *